(12) United States Patent
Ban

(10) Patent No.: US 8,074,196 B2
(45) Date of Patent: Dec. 6, 2011

(54) INTEGRATED CIRCUIT DESIGN SUPPORT APPARATUS, INTEGRATED CIRCUIT DESIGN SUPPORT METHOD, INTEGRATED CIRCUIT DESIGN SUPPORT PROGRAM, AND RECORDING MEDIUM WITH SAID PROGRAM RECORDED THEREIN

(75) Inventor: Hiromasa Ban, Odawara (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 12/103,958

(22) Filed: Apr. 16, 2008

(65) Prior Publication Data

US 2009/0217231 A1  Aug. 27, 2009

(30) Foreign Application Priority Data

Feb. 22, 2008 (JP) ................. 2008-042083

(51) Int. Cl.
G06F 17/50 (2006.01)
(52) U.S. Cl. ........................................ 716/110
(58) Field of Classification Search ............. 716/30–139
See application file for complete search history.

(56) References Cited

U.S. PATENT DOCUMENTS

| 2001/0010090 A1* | 7/2001 | Boyle et al. ................. 716/2 |
| 2001/0034595 A1* | 10/2001 | Yamaguchi ................. 703/19 |
| 2005/0278672 A1 | 12/2005 | Hosono et al. |
| 2005/0283750 A1* | 12/2005 | Kosugi et al. ............... 716/11 |
| 2006/0265678 A1 | 11/2006 | Okabe et al. |
| 2008/0104562 A1* | 5/2008 | Ichinose ....................... 716/6 |

FOREIGN PATENT DOCUMENTS

| JP | 2005-352916 | 12/2005 |
| JP | 2006-323643 | 11/2006 |

\* cited by examiner

*Primary Examiner* — Vuthe Siek
*Assistant Examiner* — Aric Lin
(74) *Attorney, Agent, or Firm* — Brundidge & Stanger, P.C.

(57) ABSTRACT

Provided is an integrated circuit design support apparatus capable of estimating the optimal wiring length and wiring congestion at the stage of implementing a logical design of an integrated circuit, thereby preventing the do-over of the logical design or functional design caused by a wiring delay that is discovered at a packaging design stage, and shortening the time required for designing the integrated circuit. The present invention is able to accurately estimate the wiring length between the modules and the wiring congestion in the modules at the stage of implementing the logical design of the integrated circuit, and reflect the logical design result of the integrated circuit in the packaging design of the integrated circuit.

6 Claims, 16 Drawing Sheets

| STARTING POINT | ENDING POINT | NUMBER OF NETS |
|---|---|---|
| A | B | 2 |
| A | C | 1 |
| B | A | 0 |
| B | C | 1 |
| C | A | 0 |
| C | B | 0 |

|  | NUMBER OF GATES | GATE SIZE | PACKAGING RATIO | LAYOUT AREA |
|---|---|---|---|---|
| MODULE A | 100 | 4 | 50% | 800 |
| MODULE B | 50 | 4 | 50% | 400 |
| MODULE C | 200 | 4 | 50% | 1,600 |

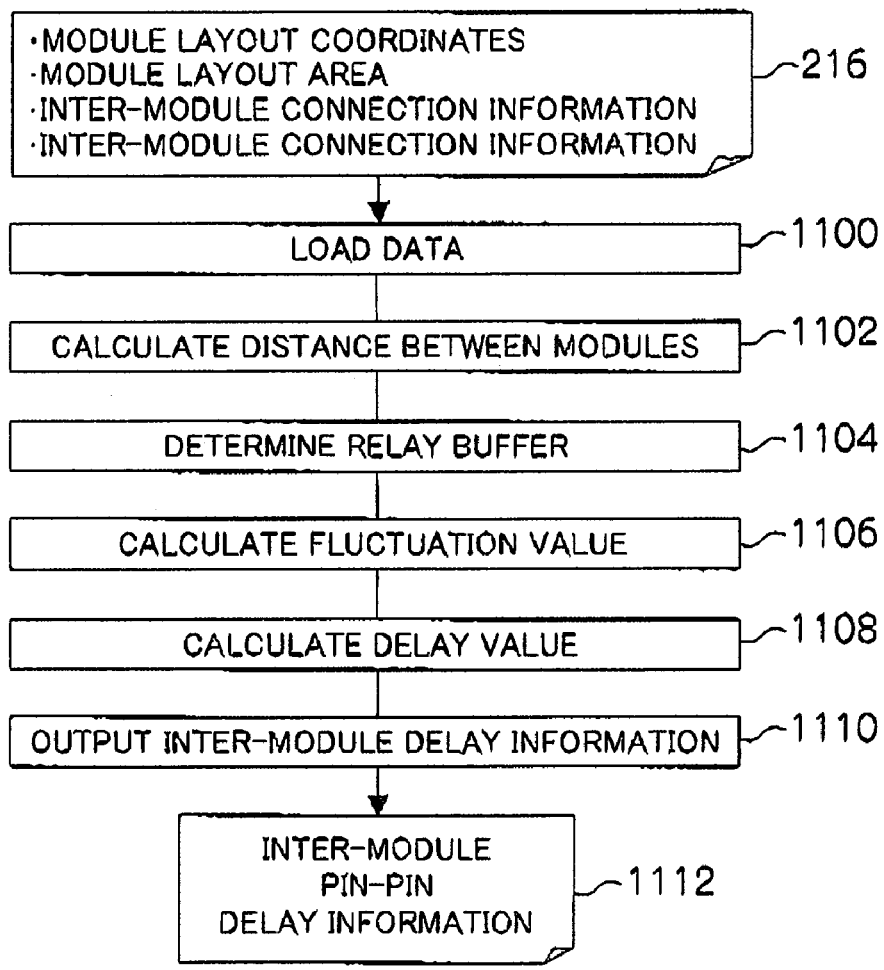

| WIRING LENGTH (mm) | RELAY BUFFER TYPE | NUMBER OF INSERTIONS |
|---|---|---|
| ~0.2 | NO INSERTION | - |
| 0.2~0.5 | LOW DRIVE BUFFER | ONE/0.25mm |
| 0.5~2.0 | MID DRIVE BUFFER | ONE/0.5mm |
| 2.0~ | HIGH DRIVE BUFFER | ONE/2.0mm |

| SIZE [mm□] | FLUCTUATION DELAY [ns] |
|---|---|
| 1 | 0.3 |
| 1.5 | 0.5 |
| 2 | 0.6 |
| 3 | 0.7 |
| 4 | 0.8 |
| 5 | 0.9 |

FIG.20

|  | LOW DRIVE | MID DRIVE | HIGH DRIVE |
|---|---|---|---|
| TOLERABLE LOAD CAPACITY | 1 | x2 | x8 |
| GATE SIZE | 1 | x4 | x10 |
| POWER CONSUMPTION | 1 | x5 | x10 | ial
INTEGRATED CIRCUIT DESIGN SUPPORT APPARATUS, INTEGRATED CIRCUIT DESIGN SUPPORT METHOD, INTEGRATED CIRCUIT DESIGN SUPPORT PROGRAM, AND RECORDING MEDIUM WITH SAID PROGRAM RECORDED THEREIN

CROSS-REFERENCES

This application relates to and claims priority from Japanese Patent Application No. 2008-042083, filed on Feb. 22, 2008, the entire disclosure of which is incorporated herein by reference.

BACKGROUND

The present invention generally relates to an apparatus and the like for the design support of integrated circuits, and in particular relates to an apparatus and the like for the design support of integrated circuits capable of estimating, with high precision, the path delay at the logical design stage before the packaging design stage of the integrated circuit.

Pursuant to the high integration in semiconductor circuits, needs are arising for causing the semiconductor circuit to operate at high frequencies. In order to achieve this, it is important to design a circuit with minimal delay caused by the wiring so that the transmission of signals between gates will fall within the timing capable of following high frequencies.

Meanwhile, since the timing between gates actually becomes clear in the packaging design stage after the logical design, there are cases where the timing that was of no problem in the logical design stage cannot not be converged in the packaging design stage. In such a case, it is necessary to redo the floor plan, and in times return all the way to the functional design stage and redo the circuit design.

Thus, in order to prevent the redoing of the circuit design, it is important to set the timing with high accuracy in the logical design stage. As conventional technology there are, for example, Japanese Patent Laid-Open Publication No. 2005-352916 and Japanese Patent Laid-Open Publication No. 2006-323643.

SUMMARY

Since the mode of wiring between the gates is determined in the packaging design stage after the logical design, the delay arising in the wiring is estimated by assuming a prescribed wiring length in the logical design stage. Meanwhile, in the packaging design stage, since the wiring length between the gates is determined irrelevant to the wiring length assumed in the logical design stage, there are cases where even if the delay in the timing analysis in the logical design stage is converged in the constrained condition, such delay cannot be actually converged in the target delay in the packaging design stage. The foregoing conventional technology does not disclose or suggest the setting of an optimal wiring length in the logical design stage.

In addition, even if it is confirmed that the delay will converge in the target value based on the timing analysis in the logical design stage, there are cases where the circumvention of wirings would occur due to the concentration and congestion of the wirings in the packaging stage of laying out the gates on a chip, which would consequently aggravate the timing.

Thus, an object of the present invention is to provide an integrated circuit design support apparatus and the like capable of estimating the optimal wiring length and wiring congestion at the stage of implementing a logical design of an integrated circuit, thereby preventing the do-over of the logical design or functional design caused by a wiring delay that is discovered at a packaging design stage, and shortening the time required for designing the integrated circuit.

In order to achieve the foregoing object, the present invention accurately estimates the wiring length between the modules and the wiring congestion in the modules at the stage of implementing the logical design of the integrated circuit, and reflects the logical design result of the integrated circuit in the packaging design of the integrated circuit.

Thus, according to the present invention, it is possible to provide an integrated circuit design support apparatus and the like capable of preventing the do-over of the logical design or functional design caused by a wiring delay that is discovered at a packaging design stage, and shortening the time required for designing the integrated circuit.

DESCRIPTION OF DRAWINGS

FIG. 10 is a chart summarizing the layout status of modules in the coordinate system of FIG. 9;

FIG. 11 is a flowchart showing the details of the calculation processing of the wiring delay between modules;

FIG. 20 is a table showing the characteristics of a low drive buffer, a mid drive buffer, and a high drive buffer;

DETAILED DESCRIPTION

Figure 1:
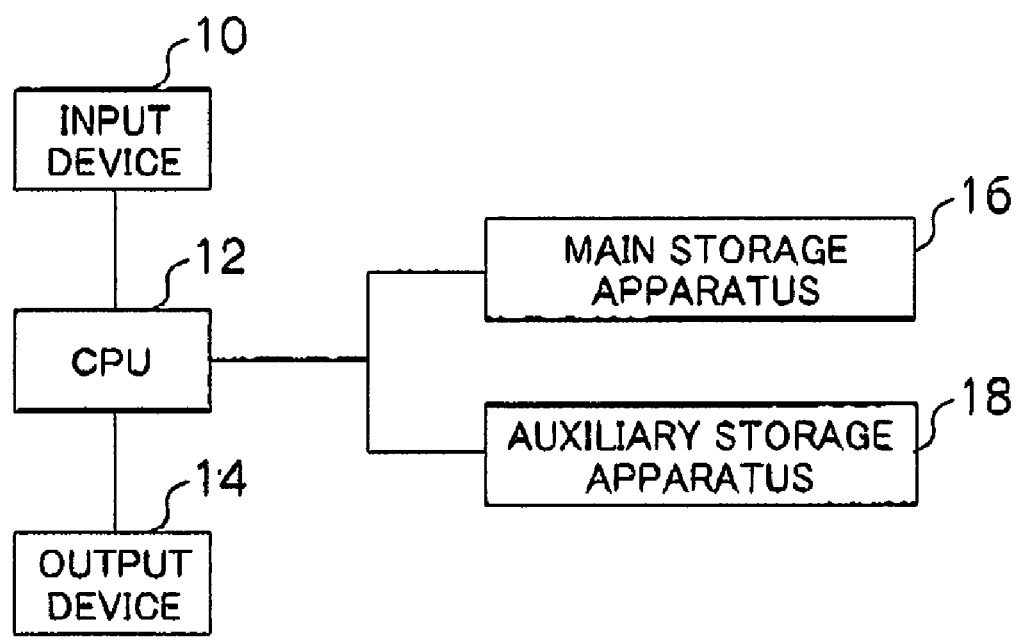
FIG. 1 is a hardware block diagram of an integrated circuit design support apparatus.

Embodiments of the present invention are now explained with reference to the attached drawings. FIG. 1 is a hardware block diagram of an integrated circuit design support apparatus. A control program (CAD) for supporting the implementation of a logical design of the integrated circuit is stored in an auxiliary storage apparatus 18 that usually exists as a hard disk.

A keyboard as an example of an input device 10 sends a command to a CPU 12, and commands the CPU 12 to implement the logical design. A program of the auxiliary storage apparatus 18 is loaded into a main storage apparatus 16, and the CPU 12 executes the program. An output device 14 such as a display or a printer provides the result of the logical design to the user. The main storage apparatus 16 temporarily stores various data to be used by the CPU during the course of the logical design. The auxiliary storage apparatus also stores various data required for the logical design.

The CPU 12 executes the control programs so as to realize a functional design unit, a logic synthesis unit, a floor plan implementation unit, an inter-module wiring delay calculation unit, a timing verification unit, and a wiring congestion verification unit. Operation of the respective components will be explained later with reference to flowcharts.

Figure 2:
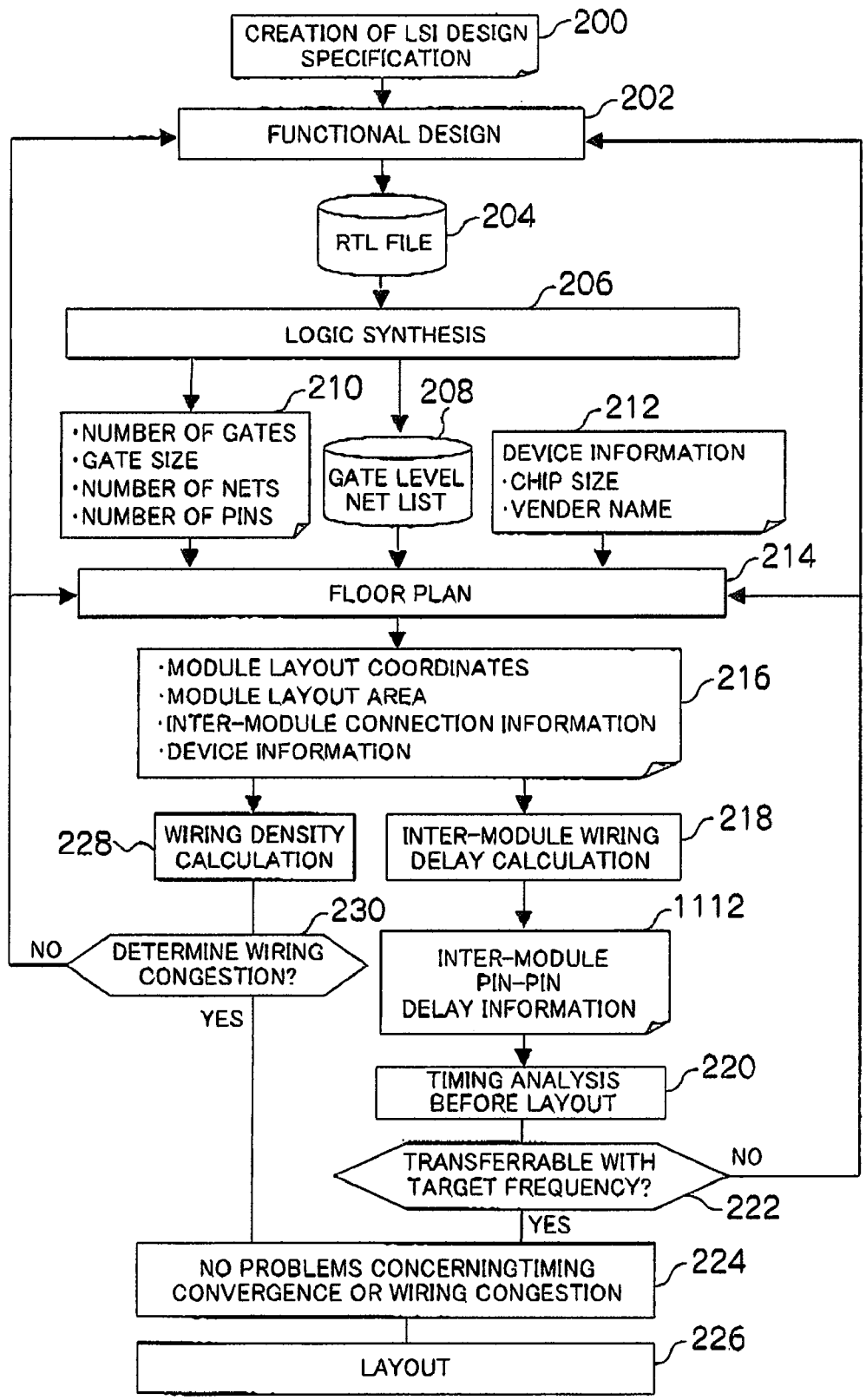
FIG. 2 is a flowchart for explaining a logical design of an integrated circuit.

FIG. 2 is a flowchart explaining the logical design of the integrated circuit. At the stage of specification design, a design specification is created by determining the architecture of a semiconductor integrated circuit (LSI) and the specification such as the target performance (200).

At the stage of functional design 202, the semiconductor integrated circuit is partitioned into a plurality of modules for each function, and an RTL file 204 configured from a combinational circuit where the respective modules are arranged between gates is created. An RTL file is a circuitry file that represents the hardware circuit with a logical expression or a state transition table. Modules are also represented as blocks and the like according to the logical design technology of integrated circuits. Submodules are sometimes set at the lower lever of the module, and in this case a module is defined as a combination of submodules.

The stage of logic synthesis 206 is the design process of converting the circuit logic written in the RTL to a net list 208 written in the gate level. A net list is a file that defines the hardware circuit with the IC cell such as flip-flop, NAND, gate such as NOR, and the wiring (net) of the IC cells.

Subsequently, a floor plan 214 is created based on the information obtained in the functional design 202, the net list 208, the number of gates, gate size, number of nets, and number of pins 210 of each chip or module obtained in the circuit design, information of the device (IC cell), and the chip size 212.

Figure 3:
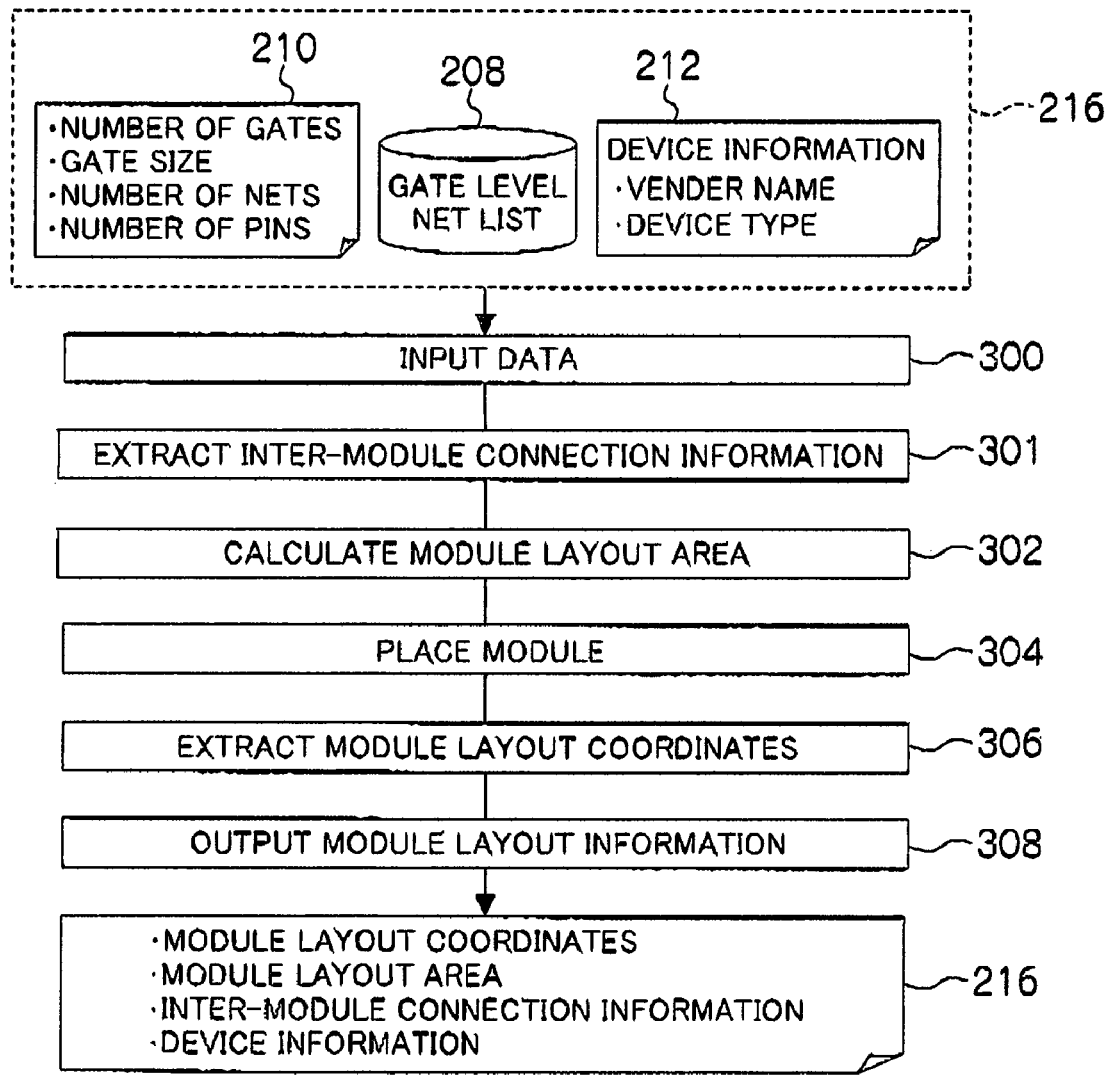
FIG. 3 is a flowchart showing the processing operation of a floor plan implementation unit.

A floor plan is a method of designing the shape of the module to be of a rectangular shape, and arranging a plurality of modules so that they do not overlap and as a whole fit in a small area. The overall area will become the chip size. FIG. 3 is a flowchart showing the processing operation of the floor plan implementation unit. Based on the input of various information 210 to 212 (300), the floor plan implementation unit executes the floor plan of step 301 onward. At step 301, the floor plan implementation unit extracts connection information between modules from the information at steps 208 to 212.

Figures 4, 5:
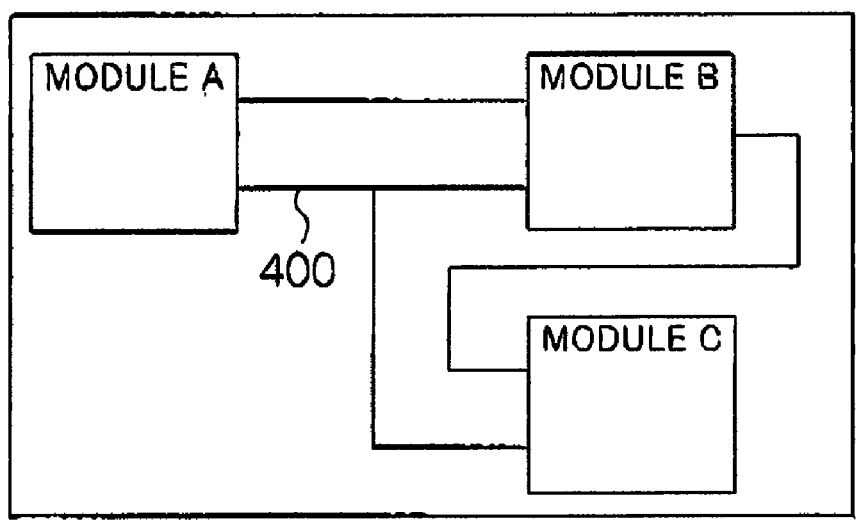
FIG. 4 is a block diagram showing a layout status of a plurality of modules obtained from the floor plan.
FIG. 5 is a chart summarizing the wiring information between modules based on FIG. 4.

For instance, if the net list shows the connection between modules as illustrated in FIG. 4, the floor plan implementation unit will extract the wiring (connection) information shown in FIG. 5. In FIG. 4, reference numeral 400 represents the net, or wiring.

The floor plan implementation unit thereafter calculates the layout area of the module; that is, the size of the area where the modules are to be arranged based on the number of gates, gate size and gate packaging ratio in the module (302).

Figures 6, 7:
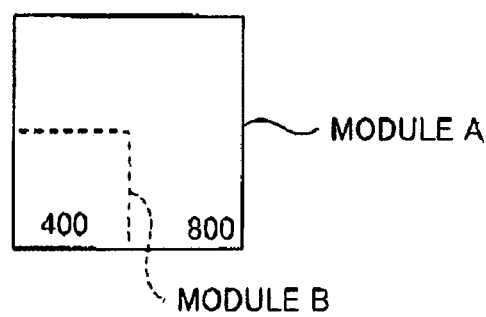
FIG. 6 is a chart summarizing the number of gates, gate size, and layout area regarding a plurality of modules.
FIG. 7 is a block diagram of the modules having the layout area of the chart shown in FIG. 6.

FIG. 6 is a chart summarizing the number of gates, gate size, and layout area of module A, module B, and module C. As shown in FIG. 7, while module B is set to a size of 400 based on FIG. 6, module A is set to a size of 800 since it has twice the number of gates as module B.

Subsequently, the floor plan implementation unit determines the arrangement of the modules in the chip area based on the connection information of modules at step 301 and so on (304). At this step, the modules corresponding to the following order are preferentially arranged in the chip in relation to the other modules.

For example, modules connected to an external interface are given first priority, modules in which the location of arrangement is to be fixed; for instance, modules that are common in the connection relationship between modules are given second priority, and modules having more connections are given the third priority.

Figure 8:
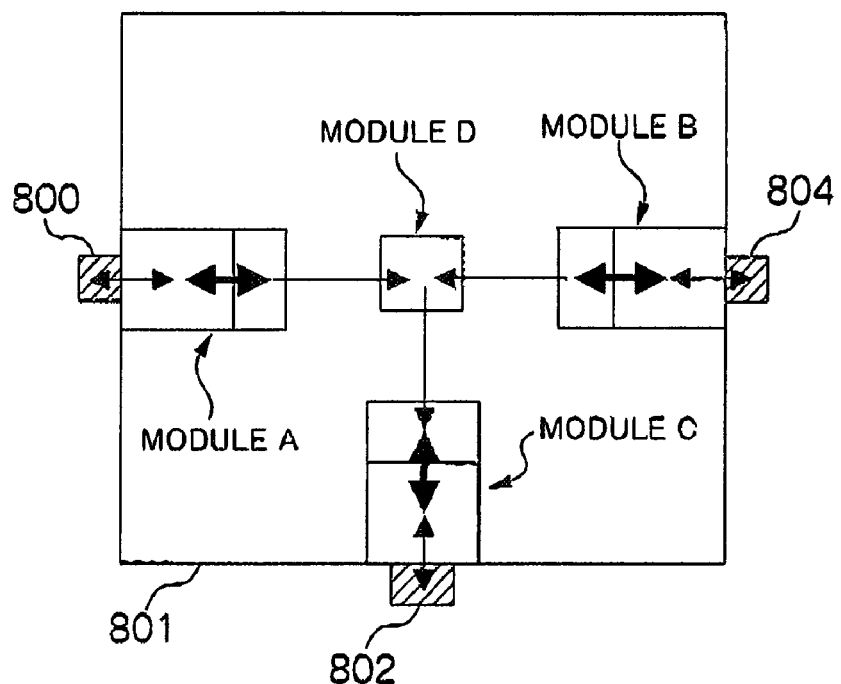
FIG. 8 is a block diagram explaining the method of arranging a plurality of modules on a chip area.

FIG. 8 shows an example of arranging modules A to D in the chip area. In FIG. 8, reference numerals 800 to 804 represent the external interfaces to the chip area 801, and module A is arranged at the boundary of the chip area on the side of the external interface 800 so as to be connected to the external interface 800. Modules B and C are also arranged similarly. Module D is arranged in the center of the chip since it is a common module to modules A to C.

Figure 9:
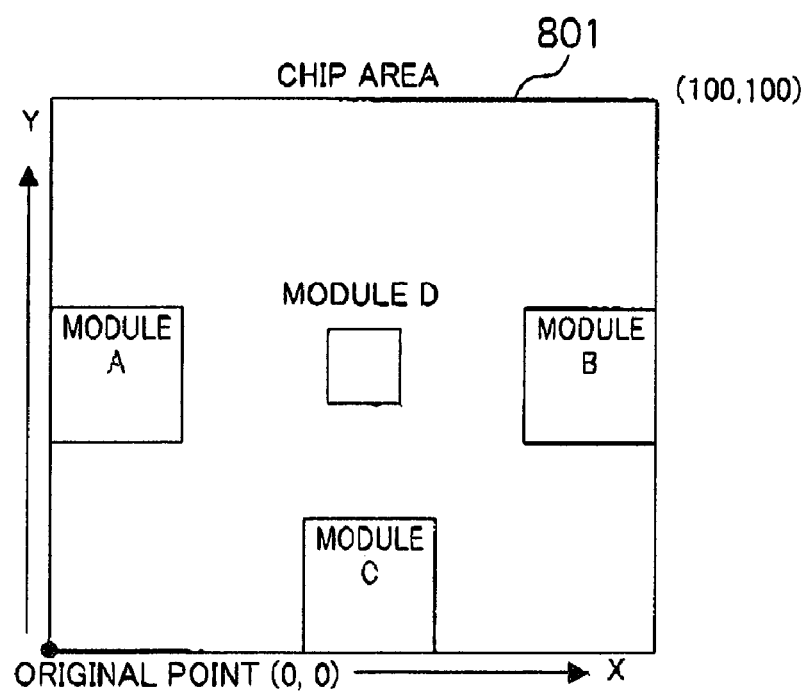
FIG. 9 is a block diagram explaining layout status of modules in relation to the coordinates of the chip area in correspondence with FIG. 8.

Subsequently, the floor plan implementation unit extracts the coordinates of the modules in the chip area based on the layout result obtained at step 304 (306). FIG. 9 shows the module layout plan in relation to the coordinate system of the chip area. The floor plan implementation unit, as shown in FIG. 10, determines the central coordinates (X, Y), width (distance of the module in the X axis direction), and height (distance of the module in the Y axis direction) of the respective modules.

The floor plan implementation unit thereafter outputs the module layout information, which is the floor plan information shown in FIG. 9, to the output device 14. The module layout information is configured from the module layout coordinates (FIG. 10), a module layout area (FIG. 7), inter-module connection information (FIG. 5), and device information.

Subsequently, the inter-module wiring delay calculation unit performs calculation processing of the wiring delay between the modules based on the floor plan information (216) as shown in FIG. 2 (218). Details regarding the calculation processing of the wiring delay between the modules are shown in FIG. 11.

Figure 12:
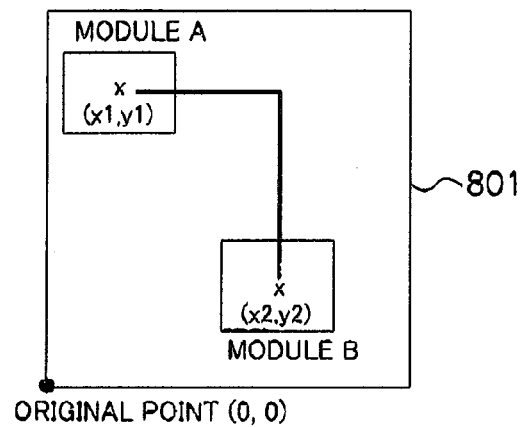
FIG. 12 is a block diagram showing an example of the calculation of the distance between a plurality of modules.

The inter-module wiring delay calculation unit loads information (216) such as the module layout coordinates (1100), and thereafter calculates the distance between the modules (1102). FIG. 12 is a block diagram showing an example of the calculation of the distance between the modules, and shows a state where module A and module B are arranged in the chip area 801. The distance between the modules is calculated, for instance, by using the central coordinates of the module. (x1, y1) are the central coordinates of module A and (x2, y2) are the central coordinates of module B. The distance between module A and module B is calculated according to |x2−x1|+|y2−y1|.

Figure 13A:
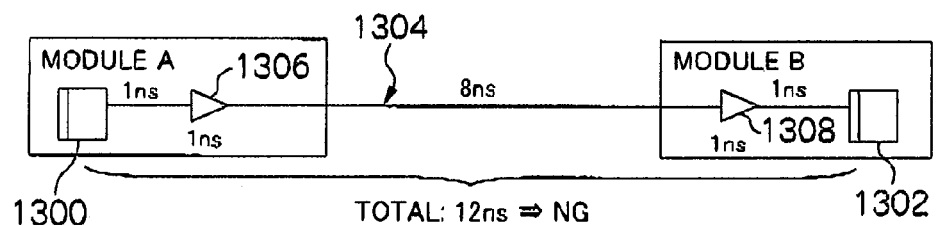
FIG. 13A and FIG. 13B are block diagrams showing a state where a relay buffer is inserted in the wiring between a plurality of modules.
Figure 13B:
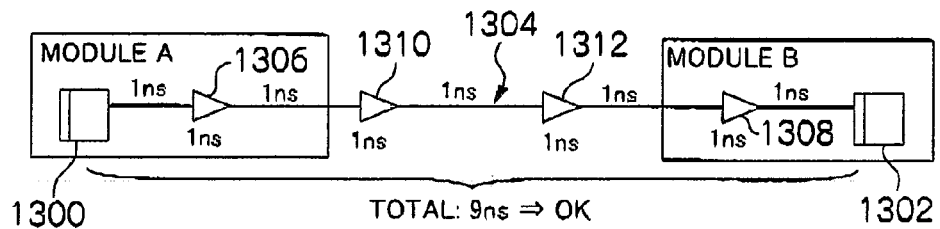

Subsequently, the inter-module wiring delay calculation unit executes the relay buffer determination processing 1104. A relay buffer is provided midway in the wiring and is used for amplifying the signal strength that is transmitted along the wiring in order to ameliorate the delay. FIG. 13A and FIG. 13B each is block diagram explaining the operation of the relay buffer, wherein FIG. 13A shows a state where a net 1304 is formed between a gate 1300 of module A and a gate 1302 of module B.

A buffer 1306 is provided to the area of module A of the net 1304, and a buffer 1308 is provided to the area of module B of the net 1304. A 1 ns delay exists between the gate 1300 and the buffer 1306, and the buffer 1306 itself has a delay of 1 ns.

A delay of 8 ns is generated between the buffer 1306 and the buffer 1308. In addition, a similar delay is generated in module B as with module [A]. As a result, a total delay of 12 nm is generated between the gate 1300 and the gate 1302. In order to enable data transfer between the gates with an operating frequency of gates in the chip at 100 MHz, the delay between the gates must be kept within 10 ns.

Therefore, the delay between the gate 1300 and the gate 1302 cannot be converged in the target delay, and the wiring between the gate 1300 and the gate 1302 will constitute a timing violation.

Thus, as shown in FIG. 13B, relay buffers 1310 and 1312 are added between module A and module B. The unique delay characteristics of these buffers shall be respectively 1 ns, and since the delay between the buffer 1306 and the buffer 1310, the delay between the buffer 1310 and the buffer 1312, and the delay between the buffer 1312 and the buffer 1308 are respectively 1 ns, the total delay between the gate 1300 and the gate 1302 will be 9 ns, and can be kept within the target 10 ns. The higher the drive force of the buffer, the more the delay can be inhibited.

Meanwhile, if a high drive buffer is used, not only will it run up the power consumption, the packaging ratio will increase and this will inflict an adverse effect on the floor plan design. Thus, rules for changing the application mode of the relay buffer in relation to the wiring length are set, and the relay buffer is applied to the wiring based on these rules. These rules are set as the control table illustrated in FIG. 14, and the control table is pre-stored in the auxiliary storage apparatus 18.

Figures 14, 15:
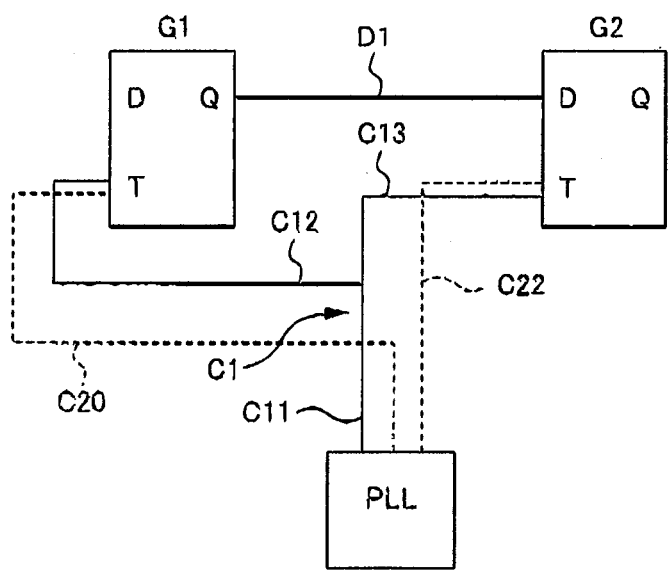
FIG. 14 is a control table showing the rules for inserting a relay buffer in the wiring between a plurality of modules.
FIG. 15 is a block diagram showing a state where a clock is supplied from the PLL to a gate to become the starting point and a gate to become the ending point in the data transfer.

As shown in FIG. 14, the differentiation of a low drive buffer, a mid drive buffer, and a high drive buffer may be made as shown in FIG. 20. FIG. 20 is a table showing the characteristics of the low drive buffer, the mid drive buffer, and the high drive buffer. In the respective characteristics shown in FIG. 20, the level of characteristics of the mid drive buffer and the high drive buffer when the level of characteristics of the low drive buffer is "1" is shown.

According to these rules, a low drive relay buffer is applied to the wiring at a ratio of one buffer per 0.25 mm of wiring to ameliorate the wiring delay when the wiring length is of a relatively short range (for instance, 0.2 to 0.5 mm), a high drive relay buffer is applied to the wiring at a ratio of one buffer per 2.0 mm of wiring to ameliorate the wiring delay while keeping the increase in the packaging ratio to a minimum when the wiring length is of a relatively long range (for instance, 2.0 mm or longer), and a mid drive buffer is used at a ratio of one buffer per 0.5 mm of wiring when the wiring length is of a mid level range (for instance, 0.5 to 2.0 mm).

The inter-module wiring delay calculation unit refers to the calculation result of the wiring distance between the modules explained in FIG. 12 and the control table illustrated in FIG. 14 to determine the characteristics of the buffer and the number of buffers to be inserted into the wiring, and reflects these in the timing analysis before the layout (packaging design) described later.

Like this, the inter-module wiring delay calculation unit determines the characteristics of the relay buffer to be applied to the wiring based on the wiring length calculated between a plurality of modules, and the frequency or ratio of applying the relay buffer to the wiring based on the control table of FIG. 14.

Subsequently, the inter-module wiring delay calculation unit calculates the delay caused by the fluctuation during the manufacture of the wiring (clock net) for supplying the clock to the gate upon packaging the integrated circuit (1106).

During the processing of manufacturing gates on a chip, for instance, the mask pattern will fluctuate in relation to the designed shape due to the difference in the shape of the mask pattern and clock net, deviation in focusing upon exposing the mask pattern, and surface irregularity during etching. Consequently, the timing that the gate receives the clock signal will differ for each gate due to the fluctuation of the clock net, and a delay will occur in the data transfer in the data transfer path. Thus, the determination and verification of timing must estimate the delay based on the fluctuation of the clock net.

FIG. 15 is a block diagram showing a state where the clock is supplied from the PLL to the gate to become the starting point and the gate to become the ending point in the data transfer. A clock net as the wiring for sending the clock signal from the PLL to the gate G1 and the gate G2 is configured. The mutually separated gate G1 and gate G2 are supplied with a clock pulse via different clock nets from the PLL.

If the gate G1 and the gate G2 are of a close distance, as shown with the solid line C1 of FIG. 15, the clock net will be configured from a common clock net C11, a clock net C12 that branches to the gate G1, and a clock net C13 that branches to the gate G2.

The difference in timing that the clock is supplied to the gate G1 and the gate G2 does not arise in the common clock net C11, and arises in the branch clock nets C12, C13. The length of the branch clock net is not that great since the gate G1 and the gate G2 are close, and the fluctuation will not be a significant value in the respective branch clock nets. Thus, the delay in the data path D1 between the gates located in a close distance will not be a large value.

Meanwhile, if the gates are far apart, this means that there is no common clock net or, even if there is a common clock net, the subsequent branch clock nets C20, C22 will become long, and the level of influence of the fluctuation will become significant.

The inter-module wiring delay calculation unit calculates the wiring delay between the modules upon estimating the influence of delay caused by the fluctuation. At the logical design stage, the module wiring delay calculation unit estimates the delay based on fluctuation in module units.

Figures 16, 17:
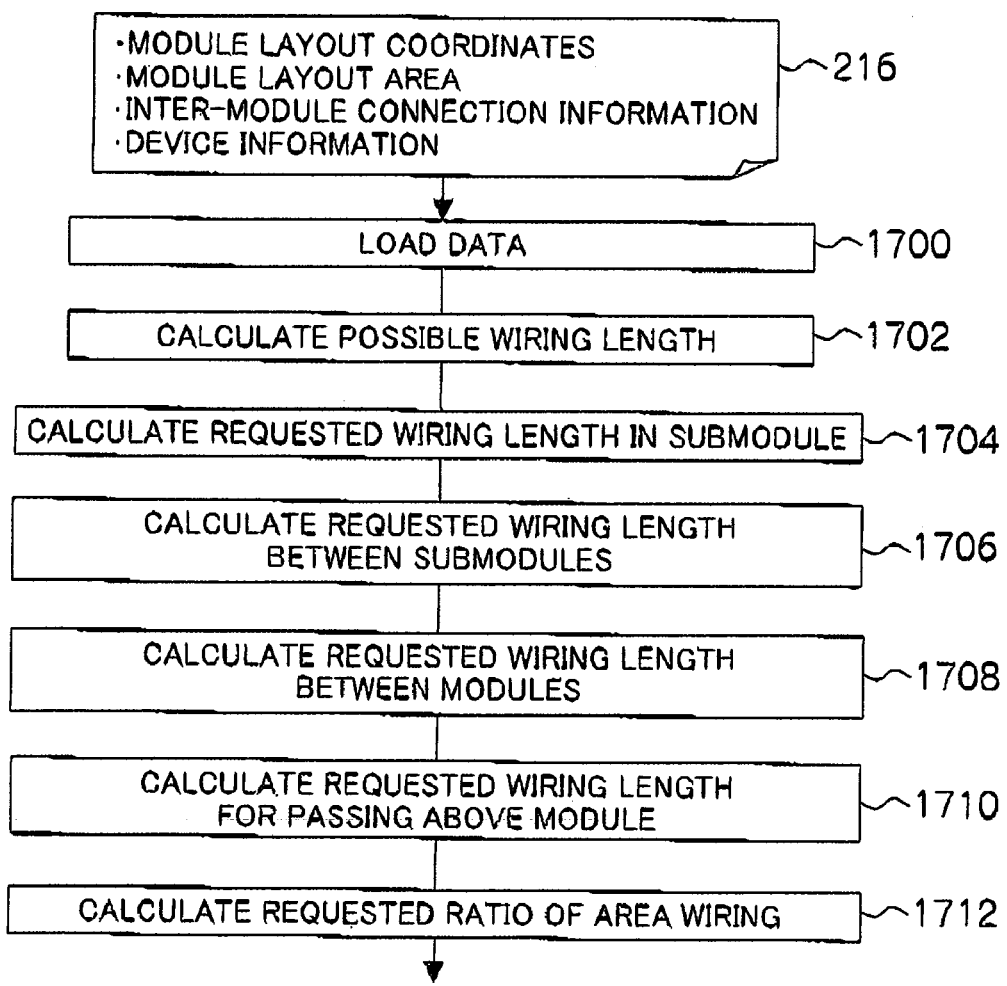
FIG. 16 is an example of a table showing the relationship of the size and fluctuation delay including the modules to be subject to data transfer.
FIG. 17 is a flowchart showing the details of wiring density calculation processing.

For example, if the transfer of data is performed in the same module, a delay is generated based on the fluctuation according to the module size (mm☐), and, if the transfer of data is performed between different modules, a delay is generated based on the fluctuation according to the minimum size (mm☐) including the different modules, and the relationship of the size (mm☐) and the delay based on the fluctuation is created in advance as a table, and this table is pre-stored in the auxiliary storage apparatus. Since the fluctuation arises during the manufacture stage of the integrated circuit, there is a unique tendency for each vendor. Thus, it is preferable to create a table for each vendor. FIG. 16 shows an example of such a table. FIG. 16 shows that the fluctuation delay increases as the size containing the modules in which data transfer is performed increases.

Since the inter-module wiring delay calculation unit knows the central, coordinates of the modules and the size of the modules in advance, it is able to determine the delay caused by the fluctuation by referring to the control table of FIG. 16.

The inter-module wiring delay calculation unit calculates the wiring delay between the modules by adding the correction value containing the delay caused by the fluctuation to the data path delay set forth based on the wiring length between the modules and the relay buffer (1108). This correction value additionally includes a jitter (PLL jitter) of a transmission circuit of the reference clock, and a setup delay of the gate (time required to latch the data).

Accordingly, the inter-module wiring delay calculation unit adds the PLL jitter (b), the setup delay (c), and the delay (d) caused by the fluctuation to the data path delay (a) as the delay arising in the wiring (path) of the data transfer source and the data transfer destination, and sets the total value thereof as the wiring delay between the modules. The inter-module wiring delay calculation unit calculates the wiring delay between the modules for each pin of the module regarding a phiout net. The inter-module wiring delay calculation unit outputs the calculation result to the output device (1110), and supplies the calculation information to the timing verification unit (1112).

The timing verification unit performs the timing analysis before layout, which is the determination of whether the total value of the data path delay (a), the PLL jitter (b), the setup delay (c), and the delay (d) caused by the fluctuation (a+b+c+d) is within the tolerable timing determined based on the clock frequency; that is, whether it is within the tolerable delay (220 of FIG. 2).

For example, if the operation clock frequency of the gate is 100 MHz, the tolerable delay will be 1/(100 MHz)=10 ns. If the jitter is 0.2 ns, the setup delay is 0.3 ns, the fluctuation delay is 0.3 ns (1 mm□), and the data path delay calculated based on the wiring length and the relay buffer is 9 ns, the total thereof will be 9.8 ns, a value that is less than 10 ns, and, therefore, the timing verification unit determines at step 222 of FIG. 2 that the timing of the data path can be converged in the target delay, and the data can be transferred between the modules at the target frequency (100 MHz).

If the timing verification unit denies this determination, it returns to the floor plan 214 or the functional design 202 and reattempts the logical design and the timing analysis 220. For example, the configuration may be such that if the [timing verification unit] re-implements the floor plan but the determination of timing is still denied, it returns all the way to the functional design.

If the timing verification unit affirms the timing verification and further affirms the verification result in the wiring congestion verification unit described later (224), the timing verification unit outputs the floor plan information 218 such as the module layout information to the packaging design apparatus, and the actual packaging design is thereby commenced (226).

The processing of the wiring congestion verification unit is now explained. The wiring congestion verification unit calculates the wiring density of the modules based on the floor plan information (228 of FIG. 2), and determines whether there is a wiring congestion in the modules based on the calculated value (230 of FIG. 2).

Details regarding the wiring density calculation processing (228) are shown in the flowchart of FIG. 17. The wiring congestion verification unit loads the floor plan information 216 (1700), and foremost calculates the wiring length that can be realized in the modules (1702).

Figure 18:
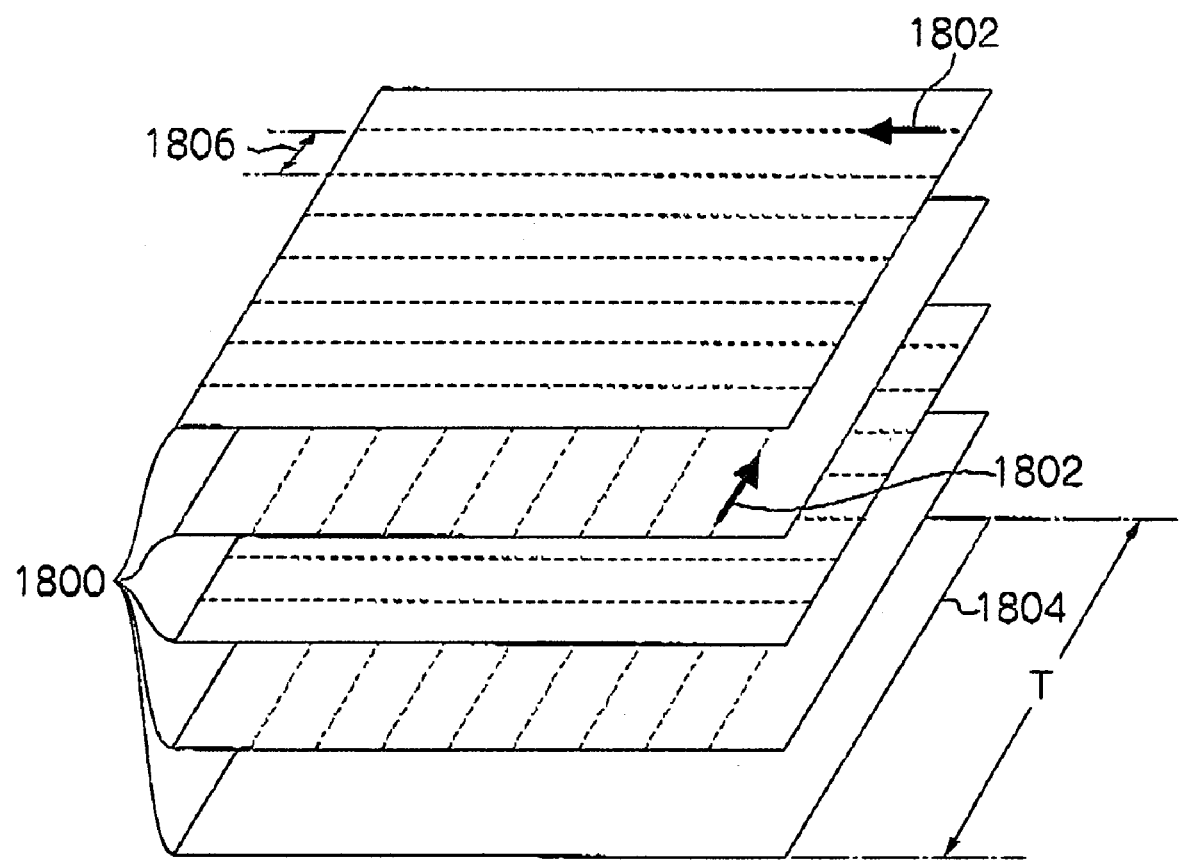
FIG. 18 is a perspective view showing a plurality of wiring layers of a module.

The mode of wiring set in the modules is foremost explained. As shown in FIG. 18, the wiring structure of an integrated circuit is configured from a plurality of wiring layers 1800. In each layer of such plurality of layers, the wiring direction 1802 is changed alternately in the orthogonal direction. The wirings of the respective layers are connected via a through hole. The gates are arranged in the lowermost layer 1804. Reference numeral 1806 represents the pitch in which the wirings are formed, and this pitch is set, for instance, to 2 mm.

If the wiring pitch of each layer is 2 mm, the module size (T of FIG. 18) is 11 mm□, and the number of layers is 5, the wiring length that can be realized in the module will be ((11 mm/2 mm)=total number of wirings)×11 mm (=module size)×5 (=number of layers)≈300 mm. The wiring congestion verification unit calculates the wiring length that can be formed regarding all modules.

Subsequently, the wiring congestion verification unit verifies whether the wiring length requested by the module will fit within the total wiring length that is realizable in the module regarding the respective modules. If it is verified that the requested wiring length will not fit within the total wiring length, this means that there is a wiring congestion regarding that module, and, even if the wiring is circumvented at the packaging design stage, there is a possibility that the delay that could be converged in the target delay at the logical design stage may constitute a timing violation at the packaging design stage. Thus, the process reattempts the floor plan or the function design without proceeding to the packaging design.

The wiring length requested by the module is the total wiring length of the wiring length required for connecting a plurality of gates in the module, the wiring length required for connecting the module to another module, and the wiring length for passing above the module.

Foremost, the wiring congestion verification unit calculates the wiring length requested in the module. The wiring length required in the module is the total of the wiring length (1704) required for connecting the gates in the submodules of the module and the wiring length (1706) required for connecting a plurality of submodules.

Figure 19:
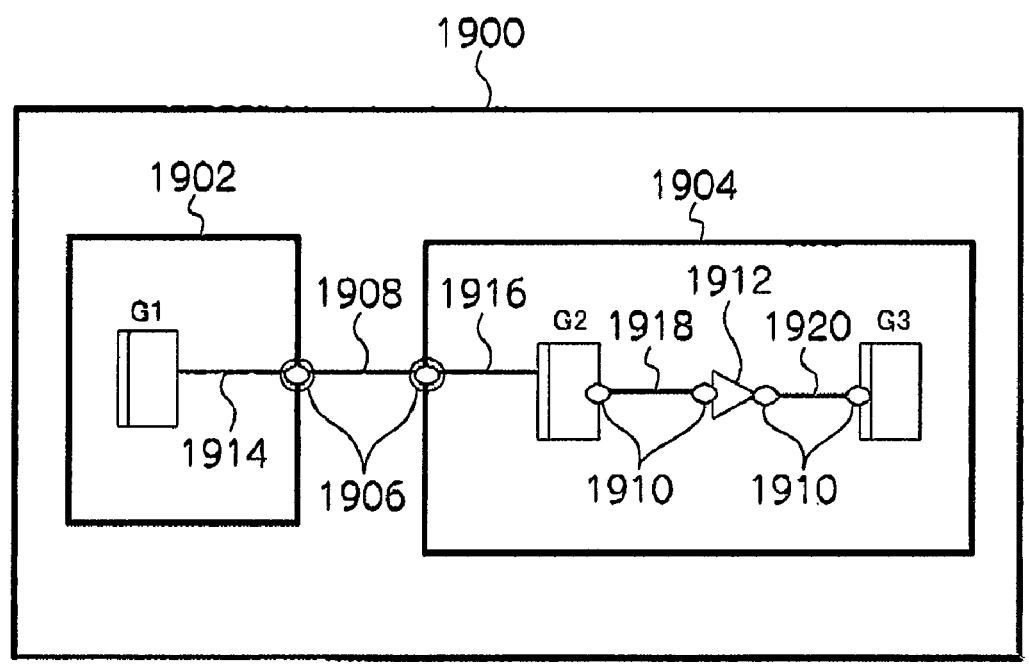
FIG. 19 is a block diagram showing a layout example of a plurality of submodules in a module.

FIG. 19 is a block diagram showing a layout example of a plurality of submodules in the module 1900. The module [1900] has two submodules 1902, 1904, and these submodules are connected via an edge pin 1906 and a wiring 1908. Reference numerals G1, G2, G3 respectively represent gates, and reference numeral 1910 represents a gate pin for connecting the gates G2, G3 and the buffer 1912.

The wirings requested in the submodules are represented with reference numerals 1914, 1916, 1918, 1920. The total length of these wirings can be simulated based on $(4/3) \times ((A/G)^{1/2} \times G^{1/6} - 1) \times P \times N$ ... Formula I; wherein A is the module size (mm□); G is the number of components (number of gates); P is the number of pins (number of gate pins); and N is the number of nets (number of nets between gates).

Meanwhile, the wiring required between the submodules is represented with reference numeral 1908. The length of this wiring can be calculated using Formula I; wherein A is the module size (mm□) G is the number of components (number of submodules); P is the number of pins (number of submodule edge pins); and N is the number of nets (number of nets between submodules).

Subsequently, the wiring congestion verification unit calculates the wiring length required for forming a wiring between the module and another module (1708). This wiring is the wiring above the area of the module. The wiring congestion verification unit performs the operation of wiring length=number of nets between modules×((½)×module size (mm□)) in order to estimate this wiring length.

Figure 21:
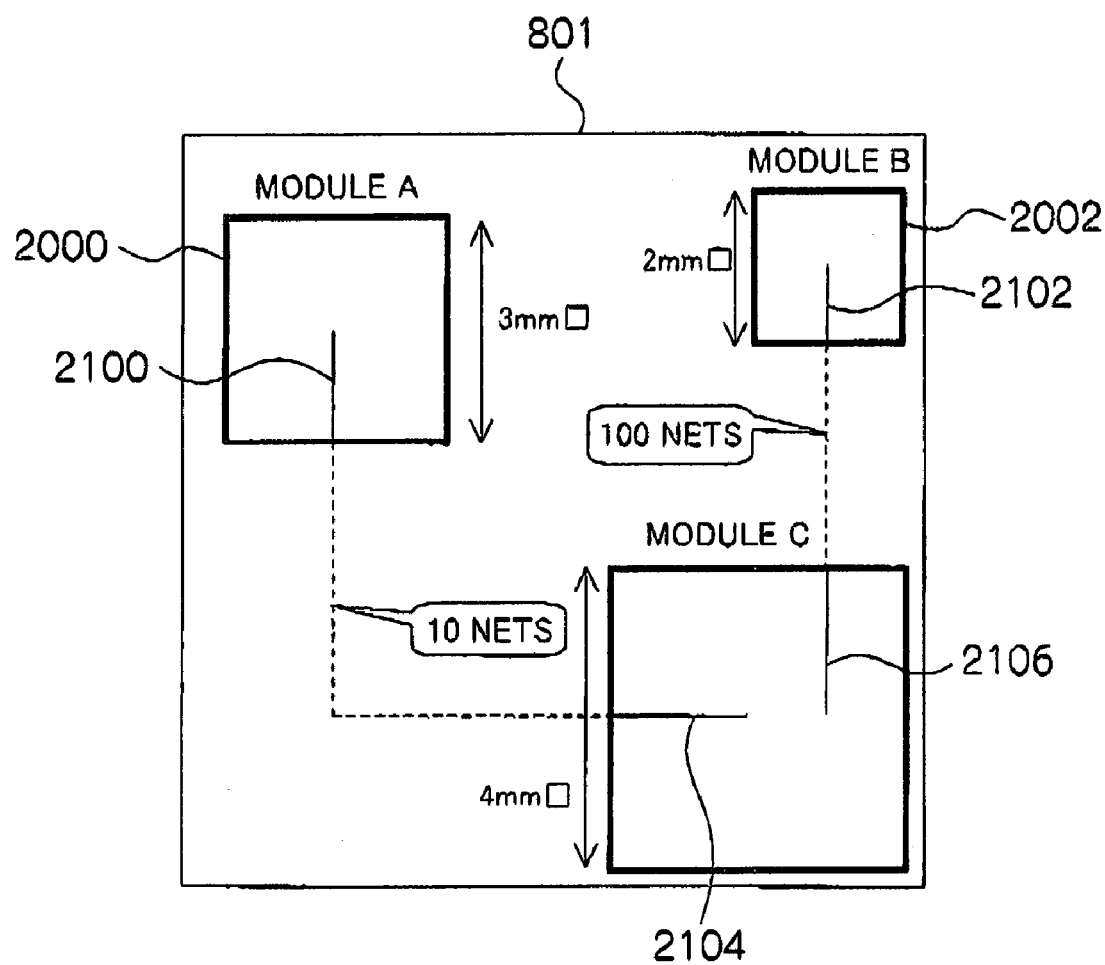
FIG. 21 is a block diagram explaining the wiring length that is required for connecting the modules regarding each of the plurality of modules arranged in the chip area.

To explain an example where module A, module B and module C are arranged on the chip according to FIG. 21, if the number of nets between module A and module C is 10 and the number of nets between module B and module C is 100, the required length of wirings 2100 to 2016 requested by the respective modules will be calculated as follows.

Wiring length required by module A=10 nets×(½)×3 mm=15 mm; wiring length required by module B=100 nets×(½)×2 mm=100 mm; and wiring length required by module C=110 nets (total of the number of nets of module A and the number of nets of module B)×(½)×4 mm=220 mm, and this wiring length is required in the respective modules.

Figure 22:
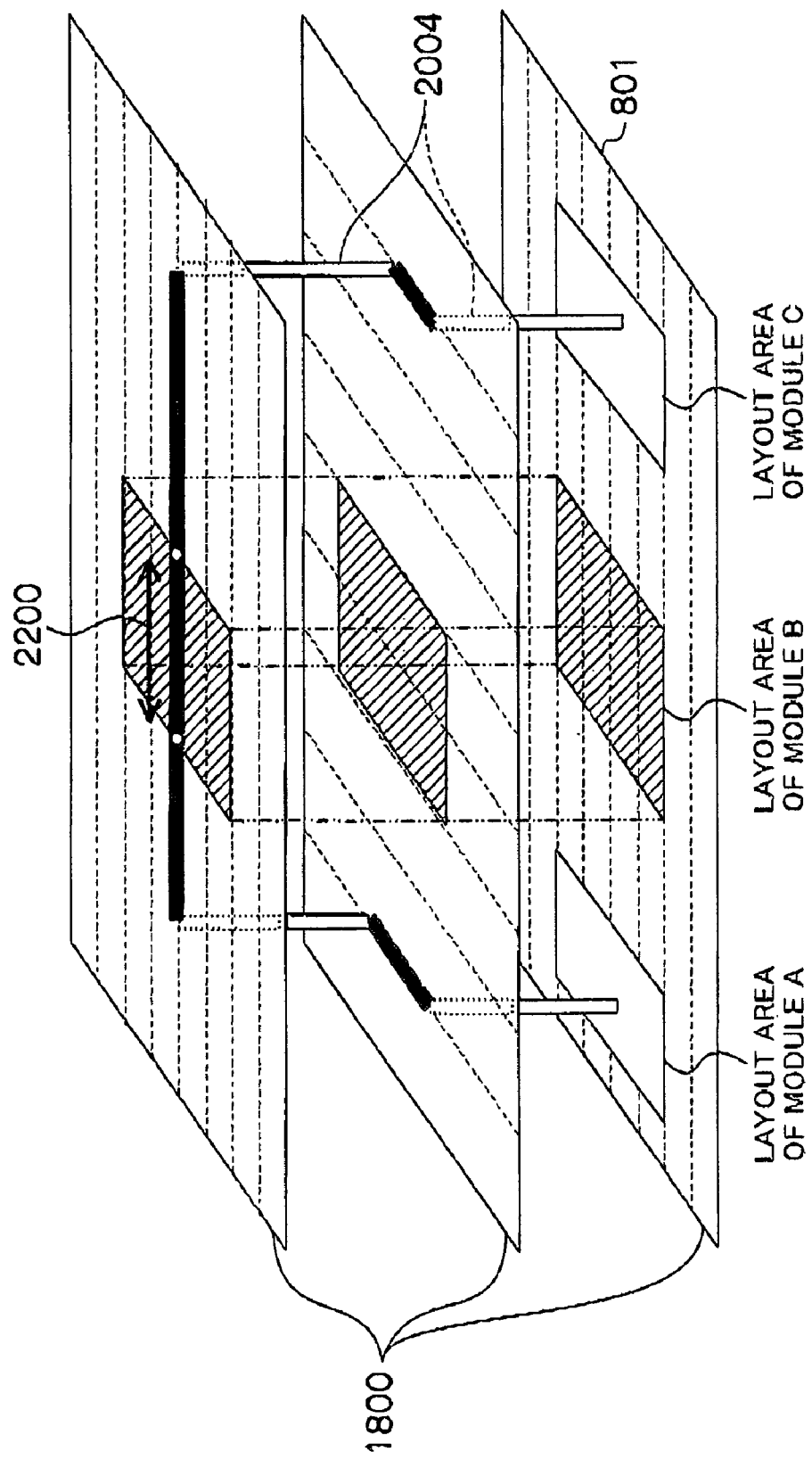
FIG. 22 is a perspective view showing a configuration where a wiring that passes through the wiring layer above the module is formed.

The wiring congestion verification unit thereafter calculates the length of the wirings that pass above the modules (1710). As shown in FIG. 22, if module B is the target of calculation, the wiring 2200 that is not connected to module B but passes through above the area of module B is the wiring to be calculated.

Reference numeral 2004 represents a through hole formed along the plurality of wiring layers for connecting the wirings in the respective wiring layers.

Figure 23:
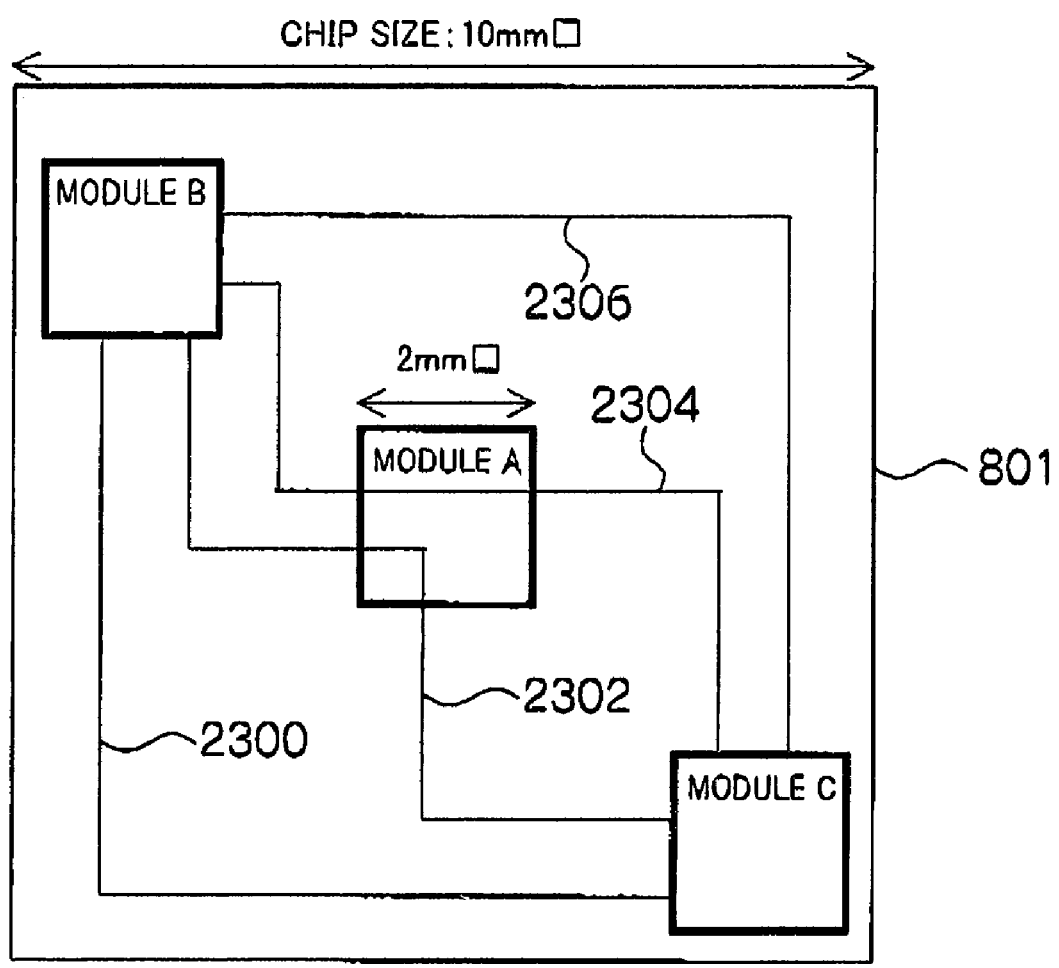
FIG. 23 is a block diagram showing an example of arranging modules comprising wiring that passes through the midair wiring layer.

Here, the wiring congestion verification unit determines whether there is a possibility that the wiring will pass above the respective modules. To explain the case illustrated in FIG. 23, among the nets (2300 to 2306) between module B and module C, there is a possibility that the wirings will pass above module A as shown with the nets 2302 and 2304. To put it differently, there is a possibility that the net may pass through the wiring layer above module A.

Whether module A has this possibility is determined by using the central coordinates of the module. If the central coordinates of module A are (xA, yA), the central coordinates of module B are (xB, yB), and the central coordinates of module C are (xC, yC), and $xB \leq xA \leq xC$ and $yC \leq yA \leq yB$, there is a possibility that the wiring between module B and module C may pass through the wiring layer above module A; that is, there is a possibility that a part of the wiring between module B and module C will be formed on the foregoing wiring layer.

In reality, however, since it cannot be known for certain whether the wiring will pass above module A unless the wiring is set in detail at the layout design stage, the length of the wire that passes through above the module is estimated according to the module size and chip size using the following formula.

Wiring length=(M/C)×N×M; wherein M is the length of one side of the module; C is the length of one side of the chip; and N is the number of nets (when module A is the target, the number of nets between the modules formed in the range of the length of one side of the chip including module A). If module A is the target of calculation, and the number of nets between module B and module C is 100, the wiring length that may pass through over module A will be 40 mm (=(2 mm/10 mm)×100 nets×2 mm). The module wiring congestion verification unit performs this calculation processing for all modules.

Subsequently, the module wiring congestion verification unit calculates the wiring density (ratio of wiring requested by the module area (wiring request rate)), which is the ratio of the total value obtained by totaling the entire wiring length calculated at the respective steps of 1704, 1706, 1708, and 1710 of FIG. 17 regarding all modules to the available wiring length (1702), as follows.

A is the possible wiring length; B is the requested wiring length in the submodule; C is the requested wiring length between the submodules; D is the requested wiring length between the modules; and E is the requested wiring length for passing above the module; wherein the wiring request rate (%)=(B+C+D+E)/A. When this request rate is less than 100%, the module wiring congestion verification unit determines that there is no wiring congestion in that module, and that there is no possibility that the wiring will be circumvented in the layout design (230 of FIG. 2).

The inter-module wiring congestion verification unit determines that there is no possibility of circumventing the wiring when the request rate regarding all modules is less than 100%. If this determination is denied, the user re-implements the floor plan 214 or the functional design 202 in response to such result.

The CPU determines that there is no problem in both the timing convergence and wiring congestion based on the positive result of the timing verification unit and the positive result of the wiring congestion verification unit (224), outputs the floor plan information to the system on the packaging design side, and thereafter executes the packaging design (226).

When determining the wiring congestion, the terminatory wiring request rate may also be a value that is less than 100%.

What is claimed is:

1. An integrated circuit design support apparatus for supporting a logical design of an integrated circuit, comprising:
a memory including a control program for implementing the logical design of the integrated circuit;
an input device for inputting a specification of the integrated circuit; and
an arithmetic apparatus;
wherein the arithmetic apparatus executes, based on the control program and the specification:
a first stage for creating a functional design of the integrated circuit,
a second stage for performing logic synthesis in response to the functional design result,
a third stage for creating a floor plan of arranging a plurality of modules on a chip in response to the logic synthesis result,
a fourth stage for determining whether there is any timing violation in wiring formed between a plurality of modules by using floor plan information obtained from the floor plan,
a fifth stage for determining whether there is any wiring congestion in the plurality of modules by using the floor plan information, and
a sixth stage for outputting the floor plan information as information for creating a packaging design of the integrated circuit when there is no timing violation and no wiring congestion,
wherein the fifth stage includes:
a tenth stage for calculating a first total length of wiring that can be formed in a module,
an eleventh stage for calculating a second total length of wiring requested by the module,
a twelfth stage for determining whether the second total length is within the first total length, and
a thirteenth stage for determining that there is no wiring congestion in the module when the determination of the twelfth stage is affirmed, and determining that there is wiring congestion in the module when the determination of the twelfth stage is denied.

2. The integrated circuit design support apparatus according to claim 1, wherein the fourth stage includes:
   a seventh stage for calculating a wiring length of the wiring between the plurality of modules; and
   an eighth stage for setting a relay buffer in the wiring based on the calculation result; and
   wherein the fourth stage determines the timing violation of the wiring after the application of the relay buffer.

3. The integrated circuit design support apparatus according to claim 2, wherein the eighth stage determines, based on a control table stored in the memory, characteristics of the relay buffer to be applied to the wiring and frequency of an application of the relay buffer to the wiring based on the wiring length calculated in the seventh stage.

4. The integrated circuit design support apparatus according to claim 1, wherein the fourth stage includes:
   a ninth stage for calculating the wiring length of the wiring between the plurality of modules;
   a fourteenth stage for calculating a delay based on a fluctuation arising in a process of manufacturing a clock supply line to be formed in the integrated circuit; and
   an fifteenth stage for calculating the delay arising in the wiring between the plurality of modules based on the wiring length obtained in the ninth stage and the fluctuation obtained in the fourteenth stage.

5. The integrated circuit design support apparatus according to claim 4, wherein the memory comprises a control table that defines a relationship between a size of a target module to which the wiring is to be formed, and the delay value based on the fluctuation corresponding to the size; and
   wherein the ninth stage obtains a delay based on the fluctuation according to the control table.

6. A recording medium having recorded thereon a computer-executable program for causing the computer to execute:

a first stage for creating a functional design of an integrated circuit based on a specification of the integrated circuit;
a second stage for performing logic synthesis in response to the functional design result;
a third stage for creating a floor plan of arranging a plurality of modules on a chip in response to the logic synthesis result;
a fourth stage for determining whether there is any timing violation in wiring formed between a plurality of modules by using floor plan information obtained from the floor plan;
a fifth stage for determining whether there is any wiring congestion in the plurality of modules by using the floor plan information;
a sixth stage for outputting the floor plan information as information for creating a packaging design of the integrated circuit when there is no timing violation and no wiring congestion,
wherein the fifth stage includes:
a tenth stage for calculating a first total length of wiring that can be formed in a module,
an eleventh stage for calculating a second total length of wiring requested by the module,
a twelfth stage for determining whether the second total length is within the first total length, and
a thirteenth stage for determining that there is no wiring congestion in the module when the determination of the twelfth stage is affirmed, and determining that there is wiring congestion in the module when the determination of the twelfth stage is denied.

* * * * *